Feb. 7, 1961

N. G. VOGL, JR 2,971,181

APPARATUS EMPLOYING SOLID STATE COMPONENTS

Filed Feb. 27, 1959

INVENTOR
NORBERT G. VOGL
BY *Wesley De Bruin*
ATTORNEY

United States Patent Office 2,971,181

Patented Feb. 7, 1961

2,971,181

APPARATUS EMPLOYING SOLID STATE COMPONENTS

Norbert G. Vogl, Jr., Wappingers Falls, N.Y., assignor to International Business Machines Corporation, New York, N.Y., a corporation of New York Filed Feb. 27, 1959, Ser. No. 796,047

4 Claims. (Cl. 340—174)

This invention relates to protection apparatus and more particularly, though not exclusively, to apparatus for protecting the drivers employed to drive a magnetic switch.

Applicant's novel protection apparatus is disclosed herein as employed with "Magnetic Switching Devices" generally of the type disclosed and claimed in the United States patent applications of Gregory Constantine, Jr., filed June 30, 1958, Serial Numbers 745,395 and 745,662, and of common assignee herewith. Subsequent to the detailed disclosure of applicant's invention, set forth hereinafter, it will be fully apparent to those skilled in the art that applicant's contribution to the art is not limited to an improved magnetic switching device.

The illustrative embodiment of applicant's invention, employs a minimum number of inexpensive components, namely, bistable magnetic elements, or cores, which "per se" are well known to the prior art.

Data processing machines employ a memory which may be of the magnetic core type comprising a group of memory planes each consisting of a plurality of magnetic cores arranged in a matrix of columns and rows. Generally, each plane is provided with row windings each inductively coupling a row of cores and separate column windings each inductively coupling a column of cores. The corresponding row windings and the corresponding column windings are respectively connected so that a selected row and column winding intersect a group of cores occupying corresponding positions in the memory planes. Excitation of both a selected row and column winding causes the cores at the intersections of these windings to have their magnetic condition changed. Thus a group of memory cores, corresponding to the bits of a data word, may be selected by applying a drive pulse coincidently to a selected row and column winding. Each plane is also provided with a sense winding inductively coupled to all of the cores in the plane to sense the change in magnetic condition of the selected core in the plane.

Selection of a row winding and column winding may be accomplished by a magnetic switch. One type of magnetic switch, is the load sharing type, generally of the type disclosed and claimed in the afore-identified U.S. patent applications of Gregory Constantine, Jr., which consists of a plurality of magnetic cores having a plurality of windings inductively coupled thereto in accordance with a predetermined combinatorial code. Each core has an output winding connected to a row or column winding of the memory. Drive means are provided for applying drive pulses coincidently to selected ones of the windings so that a desired one of the cores has its magnetic condition changed inducing a signal in its output winding which is used to drive a selected row or column winding of the memory. This arrangement permits the power from several sources to be combined into a single high powered output signal. Consequently, each source need only furnish a fraction of the power required by the load.

One of the major problems encountered in magnetic switches, prior to the teaching disclosed in the afore-identified United States patent applications of Gregory Constantine, Jr., is that of unwanted signals, termed noise, generated in the unselected cores when the selected core is being driven. Thus, though the magnetic effect due to the drive current passing through an unselected core in the same sense is partially cancelled by the magnetic effect due to the drive currents passing through the unselected core in the opposite sense, the net magnetic effect causes the unselected core to be driven a small amount thereby inducing a small undesirable noise signal in the output winding thereof. This spurious output is applied to an unselected winding of the memory and may start to switch an unselected group of memory cores tending to destroy their stored information or produce incorrect outputs from the memory. This is especially so during the read time of a memory cycle when data is being sensed on the sense wires of memory. Furthermore, the drivers must furnish the additional power which goes into these spurious signals and does no useful work.

As will be fully apparent from the detailed description, set forth hereinafter, the practice of applicant's invention in the embodiment of a magnetic switching device further suppresses the creation of undesired, or "noise signals" and their accompanying detrimental and possible error introducing effects.

In accordance with the teaching of the afore-identified United States patent applications of Gregory Constantine, Jr., a magnetic switch is provided comprising a plurality of magnetic cores having a plurality of pairs of windings inductively coupled to each core in a different manner. Driver means are provided to apply drive current coincidently to selected ones of the windings for selecting one of the cores in accordance with a predetermined combinatorial code. The selected windings are wound on the selected core in such a manner that the magnetic effect on the selected core due to the currents in the selected windings is additive to produce excitation of the selected core while the selected windings are wound on the remaining unselected cores, except one, in such a manner that the magnetic effect on these remaining unselected cores, due to the currents in the selected windings, is cancelled to produce an excitation thereof, and the selected windings are wound on the one remaining unselected core in a complementary manner to that on the selected core so that the magnetic effect due to the currents in the selected windings is additive to produce excitation in the opposite sense to that produced in the selected core.

In accordance with the present invention a magnetic switch is provided with protection apparatus comprising a plurality of magnetic elements, or balancing cores, each of which is respectively inductively coupled to a discrete drive line and to the common of the drive lines. When the drive currents of the energized drive lines are substantially of equal magnitude, then the ampere-turns of magnetomotive force impressed on each of the balance cores associated with an energized drive line, is approximately, or fully, offset by the ampere-turns impressed thereon by the common of the drive lines. Hence, each balance core inductively coupled to an energized drive line does not change its state, or "flip." Each balance core, associated with a non-energized drive line, is subjected to a magnetomotive force due to the ampere-turns of the common of the drive lines. This magnetomotive force drives each of these balance cores, i.e., the balance cores associated with a non-energized drive line, into saturation in the direction of its existing remanent state and hence no appreciable, if any, flux change therein occurs. If the current in an energized drive line is greater in magnitude than normal, the ampere turns and the magnetomotive force impressed on this balance core due to its high drive line current, overcomes the ampere turns and magnetomotive force impressed on this balance core due to the common drive line current, causing this balance core to "flip," i.e., change from its existing remanent state, to, or approaching, its other remanent state. The "flipping" of a balance core results in an appreciable change in flux which induces a voltage in the drive line associated therewith. This induced voltage opposes the drive current and thereby acts to limit the drive current. Further, the "flipping" of a balance core is a positive indication that the drive current associated therewith is of greater magnitude than desired. It will be appreciated that the existence of a large magnitude drive current, appreciably larger than that which the magnet switch and its associated circuitry utilize under optimum conditions, will materially reduce the "life" of solid state components, such as transistors, and introduces spurious operation of the magnetic switch.

It will be appreciated that the defective drive current source can readily be ascertained through an examination of the remanent state of the balance cores. Further a suitable bias winding may be employed to assure that all balance cores are initially in the desired remanent state.

A primary object of this invention is to provide an improved magnetic switch.

Another object of this invention is to provide a novel magnetic switch which suppresses the rendition of spurious outputs.

Another object of this invention is to provide an improved magnetic switch for reducing noise pickup in a magnetic core memory.

A still further object of this invention is to provide a novel protection means for protecting solid state components from destructively high currents of a transient or steady-state nature.

A still further object of this invention is to provide a novel current balancer for a voltage driven memory switch or the like.

Yet another object of this invention is the provision of an overload current suppressing and overload current indicating device consisting essentially of a plurality of magnetic elements or cores.

The foregoing and other objects, features and advantages of the invention will be apparent from the following more particular description of preferred embodiments of the invention, as illustrated in the accompanying drawings.

Figures 1, 2:
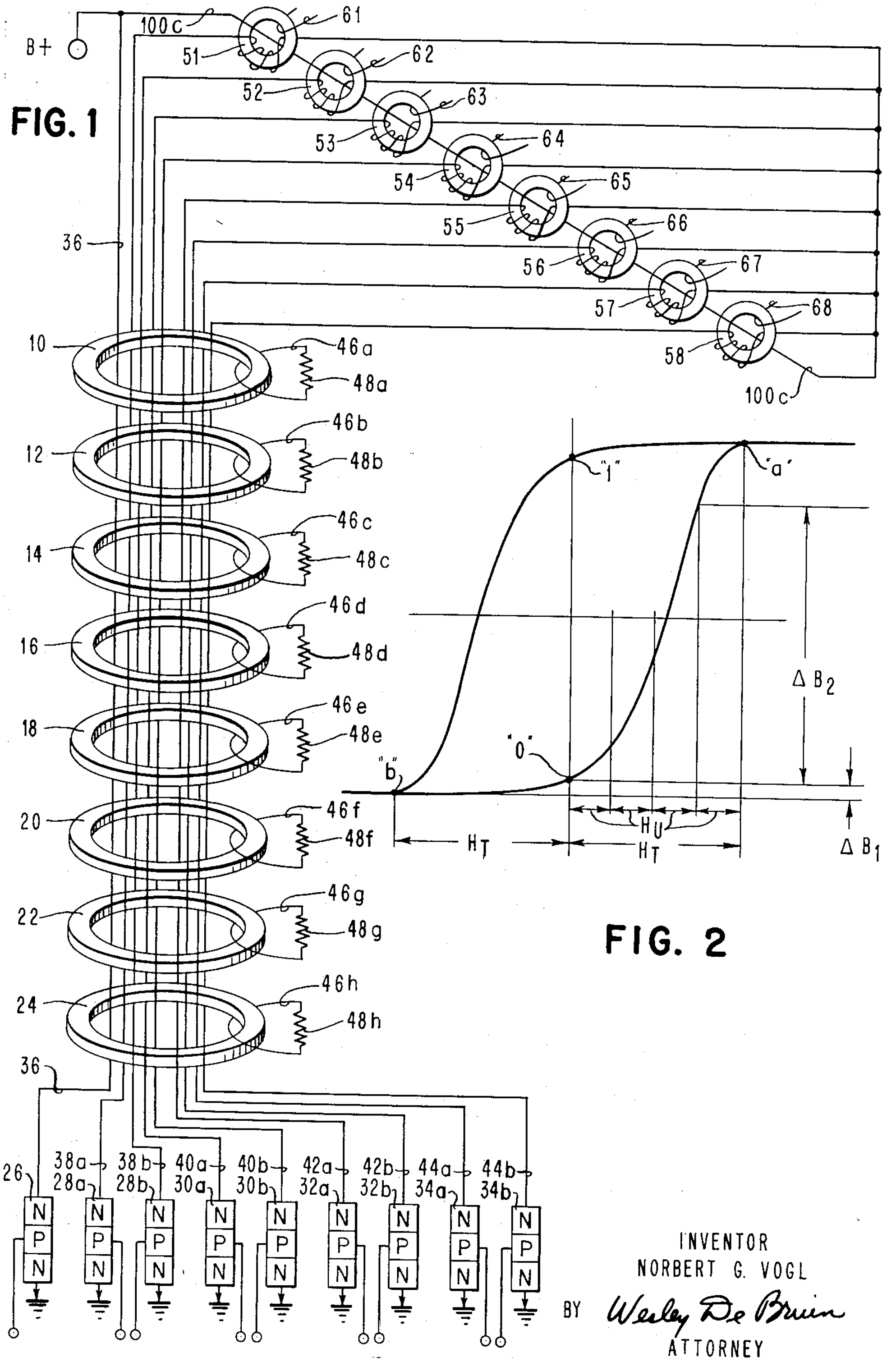
Fig. 1 is a schematic drawing of a magnetic switch embodying the present invention.
Fig. 2 is a hysteresis curve which is illustrated as an aid in understanding the operation of the embodiment of Fig. 1.

Referring now to Fig. 1, there is shown a schematic diagram of one embodiment of the present invention. It comprises a magnetic switch which includes eight switch magnetic cores 10, 12, 14, 16, 18, 20, 22 and 24 and eight balance magnetic cores 51, 52, 53, 54, 55, 56, 57 and 58, which may respectively be toroidal in shape though other suitable shapes may be used. A single write input winding 36 passes serially through the eight switch cores to a potential source +B and four pairs of read input windings 38, 40, 42 and 44 are serially wound, in a different pattern, through the eight switch cores, with the windings of each pair passing in opposite sense through each switch core. The eight windings of the four pairs of read input windings, namely drive lines 38*a*, 38*b*, 40*a*, 40*b*, 42*a*, 42*b*, 44*a* and 44*b* are also inductively coupled each to a single balance core 51, 52, 53, 54, 55, 56, 57 and 58, respectively, and commonly connected to common drive line 100*c*. Common drive line 100*c* is inductively coupled to each of the balance cores 51, 52, 53, 54, 55, 56, 57 and 58 and connected to the potential source +B as shown in Fig. 1. Each switch core has an output winding (46*a* through 46*h*, respectively) which is connected to a row or column winding of the memory represented by the resistor load 48. Each balance core may have an output winding (61 through 68, respectively) for rendering an electrical output indicating that the driver source corresponding thereto is delivering a driving current that is above normal in magnitude. An NPN transistor driver 26 is connected to the write input winding 36 and four pairs of NPN transistor drivers, namely 28*a*, 28*b*, 30*a*, 30*b*, 32*a*, 32*b*, 34*a* and 34*b*, are respectively connected to the four pairs of read input windings (also termed drive lines), namely 38*a*, 38*b*, 40*a*, 40*b*, 42*a*, 42*b*, 44*a* and 44*b*. Though NPN drivers are shown, it will be understood that other suitable drivers can be used equally as well without departing from the scope of the present invention. When a positive signal is applied to the base of the NPN transistor driver 26 it is rendered conductive to apply a drive current pulse to its associated winding 36 passing through all of the switch cores. When a positive signal is applied to the base of any one of the NPN transistor drivers, 28*a*, 28*b*, 30*a*, 30*b*, 32*a*, 32*b*, 34*a*, and 34*b*, it is rendered conductive to apply a drive current pulse to the associated winding passing through all of the switch cores, the balance core corresponding to the driver, and to all of the balance cores via the common drive line winding 100*c*.

Referring now to Fig. 2, there is shown a typical hysteresis loop for a magnetic core. Magnetic cores possess two stable or remanent states of magnetism which are opposite in sense and, consequently, a magnetic core may operate as a binary element with one remanent state representing the binary digit 1 and the opposite remanent state representing the binary digit 0. The application of a suitable drive current pulse to a wire passing through a magnetic core causes the core to follow the hysteresis loop as a function of the direction and magnitude of the current. The value of the magnitude of current necessary to generate a magnetomotive force sufficient to change the state of the core may be referred to as the threshold value. If the magnitude of the applied drive current pulse has a value which is less than the threshold value, then, the core experiences some magnetic excursion of the hysteresis loop, but when the current is removed the core will return to essentially the same remanent state at which it started. On the other hand, if the magnitude of the drive current pulse has a value which is greater than the threshold value and the current is applied in the proper direction, then, the core changes from one remanent state to the other.

Still referring to Fig. 2, it is to be appreciated that the magnetomotive force that a core is subjected to, is proportional to the ampere-turns impressed on the core. Thus, it is apparent that the magnetomotive force produced by an N unit current flowing through a winding having M turns is equal to the magnetomotive force produced by an M unit current flowing through a winding having N turns.

Considering unipolar drive current pulses, the sense of a winding may be defined as the direction in which it passes through the core. Accordingly, a winding in the "1" sense may arbitrarily be designated as passing over and under a core so that a unipolar drive current pulse applied thereto causes a magnetomotive force to be generated which tends to drive the core towards magnetic saturation in the "1" state. A winding in the "0" sense may be designated as passing under and over a core so that a unipolar drive current pulse applied thereto causes a magnetomotive force to be generated which tends to drive the core towards magnetic saturation in the "0" state. Thus, considering a core in the "0" state and a winding passing therethrough in the "1" sense, then if a unipolar drive current pulse is applied to the winding, the magnitude of which has a value greater than the threshold value, the core follows the hysteresis loop to the saturation point "*a*" and when the drive current pulse is terminated the core comes to rest in the "1" state. Likewise, considering the core in the "1" state and a winding passing therethrough in the "0" sense, then, if a unipolar drive current pulse is applied to the winding, the magnitude of which has a value greater than the threshold value, the core follows the hysteresis loop to the saturation point "*b*" and when the drive current pulse is terminated the core comes to rest in the "0" state. The change in flux, when the core switches from the "0" to the "1" state, induces an output pulse in the output winding of the core which may be used as a read drive pulse for a selected column or row winding of memory. Likewise, the change in flux, when the core switches from the "1" state to the "0" state, induces an output pulse in the output winding of the core equal in magnitude but opposite in polarity to that of the output pulse produced when the core switches from the "0" state to the "1" state and may be used as a write drive pulse for the selected column or row winding of memory.

The principle of load sharing is to combine the magnetomotive forces generated by the currents from several drivers so that the combined magnetomotive force has a value equal to that generated by the current which would otherwise be applied from a single driver. Consequently, each driver need only furnish a fraction of the current required to change the state of the magnetic core. Thus, with respect to the switch cores, the unit of current provided by each driver generates magnetomotive force $H_u$ equal to $$\frac{H_T}{D}$$

where $H_t$ is the total magnetomotive force required to drive the core and D is the number of drivers applying drive currents to the core. Correspondingly with respect to the balance cores, the unit of current provided by each driver to the balance winding of its associated balance core generates magnetomotive force $H_T$ equal to $NH_u$, where $H_T$ is the total magnetomotive force required to drive the balance core, N is the number of turns of the balance core winding, and $H_u$ is the magnetomotive force generated by a unit current flowing through a single turn of the balance core winding. Thus, if the balance core winding has N turns the flow of a unit current therethrough generates a magnetomotive force of $NH_u$.

In applying the principle of load sharing, D windings are inductively coupled to a switch core in such a sense that by applying unit drive current pulses coincidently to the D windings, D units of magnetomotive force are combined to drive the switch core from one state of magnetism to the other. The change in flux, when the switch core switches from one state to the other, induces an output pulse in the output winding of the core, which may be used as a drive pulse for a selected column or row winding of memory.

Fig. 1 discloses a load sharing magnetic switch including a plurality of switch cores having D pairs of read windings inductively coupled thereto with a different winding pattern for each switch core so that a single switch core may be uniquely selected, in accordance with a read selection pattern, during read time of a memory cycle, to be switched from one state of magnetism to the other. One unselected switch core of the magnetic switch having a read selection pattern which is the complement of the selected switch core's pattern will receive excitation equal to that received by the selected switch core but opposite in sense. Hence, this one unselected switch core is driven along the saturated region of the hysteresis loop causing a very small spurious output to be produced in the output winding thereof. The remaining unselected switch cores of the magnetic switch receive zero net excitation so that no spurious outputs are produced in the output windings thereof. A single write winding is inductively coupled to each of the switch cores so that, during the write time of a memory cycle, the previously selected switch core is switched from the other state of magnetism back to the one state.

To accomplish this result, a particular read winding pattern must be developed. Thus, the basic pattern is shown in Table I below:

*Table I*

| | |
|---|---|
| 1 | 1 |
| 1 | 0 |
| 0 | 0 |
| 0 | 1 |

In Table I a row represents a single switch core and a column represents a complementary pair of windings. A convention may be adopted whereby a 1, in Table I, represents the complementary pair of windings passing through the core in a 1 and 0 sense, respectively, and a 0, in Table I, represents the complementary pair of windings passing through the core in a 0 and 1 sense, respectively. The basic pattern may be expanded most conveniently without producing any additional spurious outputs by doubling the size each time and repeating the previous pattern in quadrants I, II and III, and complementing the pattern in quadrant IV. Consequently, the basic pattern may be expanded for an eight output magnetic switch to the following pattern shown in Table II below:

*Table II*

| | | | |
|---|---|---|---|
| | 11 | 11 | |
| (II) | 10 | 10 | (I) |
| | 01 | 01 | |
| | 00 | 00 | |
| | 11 | 00 | |
| | 10 | 01 | |
| (III) | 01 | 10 | (IV) |
| | 00 | 11 | |

Further expansions may be accomplished in a similar manner to provide the winding patterns for a 16 output magnetic switch, a 32 output magnetic switch etc.

Following this expansion the read winding pattern for the eight output magnetic switch of Fig. 1 is shown in Table III below:

*Table III*

| Switch Core No. | Switch Core Pair Winding Pattern | "Sense of Switch Core Windings, or Sense of Respective Driver Lines" | | | |
|---|---|---|---|---|---|
| | | 38a 38b | 40a 40b | 42a 42b | 44a 44b |
| 10 | 1 1 1 1 | 1 0 | 1 0 | 1 0 | 1 0 |
| 12 | 1 0 1 0 | 1 0 | 0 1 | 1 0 | 0 1 |
| 14 | 1 1 0 0 | 1 0 | 1 0 | 0 1 | 0 1 |
| 16 | 1 0 0 1 | 1 0 | 0 1 | 0 1 | 1 0 |
| 18 | 0 0 0 0 | 0 1 | 0 1 | 0 1 | 0 1 |
| 20 | 0 1 0 1 | 0 1 | 1 0 | 0 1 | 1 0 |
| 22 | 0 0 1 1 | 0 1 | 0 1 | 1 0 | 1 0 |
| 24 | 0 1 1 0 | 0 1 | 1 0 | 1 0 | 0 1 |

In the operation of the magnetic switch, selection of a switch core to be driven from the zero ("0") state to the one ("1") state is accomplished by exciting in each of the selecting pair of windings, the windings which pass through the selected switch core in the "1" sense, in accordance with the read selection pattern, after which, the write winding, which passes through all of the switch cores in the "0" sense, is excited to cause the previously selected switch core to be driven from the one ("1") state back to the zero ("0") state. Thus, assume that all of the switch cores, namely, 10, 12, 14, 16, 18, 20, 22 and 24 are each initially in the "0" state and that it is desired to select switch core 14, corresponding to the read selection pattern 1100 (Table III), to be changed to the "1" state. Consequently, positive signals are applied coincidently to the bases of the transistor drivers 28*a*, 30*a*, 32*b* and 34*b* causing them to conduct and apply drive current pulses via windings, also termed drive lines 38*a*, 40*a*, 42*b* and 44*b*, respectively. Referring to Table III, it is to be noted that switch core 14 is the only switch core receiving four units of magnetomotive force in the "1" sense. Consequently, switch core 14 will be driven from the "0" state to the "1" state inducing an output pulse in the output winding 46c which operates as a read drive pulse for the load 48c. Referring again to Table III, it will be noted that when drive current pulses are applied to windings, i.e. drive lines 38a, 40a, 42b and 44b to select switch core 14, that switch cores 10, 12, 16, 18, 20 and 24 each receive two units of magnetomotive force in the "1" sense and two units of magnetomotive force in the "0" sense, which cancel each other, so that no spurious output pulse is applied to any of the respective output windings 46a, 46b, 46d, 46e, 46f and 46h. However, it will be noted that switch core 22, having a read selection pattern which is the complement of that of the selected switch core 14, receives four units of magnetomotive force in the "0" sense. Consequently, switch core 22 will be driven from the "0" state to point "*b*" on the hysteresis loop, whereby the flux change $\Delta B_1$ induces a spurious output in output winding 46g of switch core 22. This spurious output pulse is very small in amplitude and opposite in polarity to the relatively large amplitude pulse induced in the output winding of the selected core. This spurious output pulse may be minimized by utilizing magnetic cores having relatively good square loop hysteresis characteristics.

Following this, a positive signal is applied to the base of transistor driver 26 causing it to conduct and apply a drive current pulse to winding 36. This effects the application of a magneto-motive force in the "0" sense to each of the switch cores. This magnetomotive force is equal in magnitude to the four units of magnetomotive force, in the "1" sense, which were previously generated to switch selected switch core 14 from the "0" state to the "1" state. Consequently, since the previously selected switch core 14 is the only switch core presently in the "1" state, this magnetomotive force is effective to switch it from the "1" state back to the "0" state and thereby induce an output pulse in winding 46c. The waveshape of this pulse is equal in magnitude but opposite in polarity to the read pulse developed by switch core 14 in traversing the hysteresis loop from state "0" to state "1". This output pulse, appearing in winding 46c, may be employed as a write drive pulse of the memory when applied to the representative memory load 48c. The remaining switch cores 10, 12, 16, 18, 20, 22 and 24 all being in the "0" state experience an excursion on the hysteresis loop from point "0" to point "*b*" inducing negligible spurious outputs therefrom.

Referring again to Table III, it will be noted that half of the switch cores have a selection pattern which is the complement of the selection pattern of the remaining switch cores. Thus, switch cores 10 and 18 have complementary winding patterns; switch cores 12 and 20 have complementary winding patterns; switch cores 14 and 22 have complementary winding patterns; and switch cores 16 and 24 have complementary winding patterns. Accordingly, and in a similar manner, any of the other switch cores 10, 12, 16, 18, 20, 22 and 24 may be selected by applying drive current pulses to the proper windings so that the combined magnetomotive force drives the selected switch core from one remanent state to the other remanent state, while one unselected switch core with a read selection pattern which is the complement of the selected switch core pattern receives excitation equal to that received by the selected switch core but in a sense which drives it further into saturation. The remaining switch cores receive zero excitation. If it is desired to eliminate noise during the selection of a switch core and a reduction in outputs per driver can be tolerated, then, the complement cores in the magnetic switch of Fig. 1 can be eliminated, to provide a magnetic switch generally of the type described and claimed in the United States patent application of Gregory Constantine, Jr., Serial Number 745,395, filed June 30, 1958, and of common assignee herewith, wherein only the selected switch core is excited while all of the remaining cores receive zero excitation.

Furthermore, the principles of the present invention can be applied to a matrix type of magnetic switch, similar to that shown in Fig. 3 of the afore-identified United States patent application, Serial Number 745,395.

Now again referring to Fig. 1, it will be seen that drive lines 38a, 38b, 40a, 40b, 42a, 42b, 44a and 44b are electromagnetically coupled, respectively, to balance cores 51 through 58. Further, each drive line is electromagnetically coupled to its associated balance core with a number of "1" sense turns. The number of "1" sense turns is such that four units of magnetmotive force in the "1" sense are impressed on the balance core for each unit of drive current flowing in its associated drive line. Each of the drive lines, namely 38a, 38b, 40a, 40b, 42a, 42b, 44a and 44b are terminally connected to common drive line 100c. Common drive line 100c is electromagnetically coupled to each of the balance cores, in the "0" sense, such that each balance core is subjected to one unit of magnetomotive force in the "0" sense for each unit of current flowing in common drive line 100c.

Now assume that suitable positive potentials are coincidently applied to the base electrodes of transistor drivers 28b, 30b, 32b and 34b, and as a result thereof a unit of drive current flows, respectively, in drive lines 38b, 40b, 42b and 44b. Referring to Table III it will be seen that switch core 18 is selected. Further assume that each of the balance cores 51 through 58 is initially in its "0" remanent state. Balance cores 52, 54, 56 and 58 will each tend to have impressed thereon four units of magnetomotive force in the "1" sense, due to the unit drive currents flowing respectively in drive lines 38b, 40b, 42b and 44b. Hence common drive line 100c will have impressed thereon four units of drive current which will tend to impress on each of the balance cores four units of magnetomotive force in the "0" sense. Thus it will be apparent that resultant magnetomotive force impressed on each of the balance cores 52, 54, 56, and 58 will be approximately zero, whereas balance cores 51, 53, 55 and 57 will respectively traverse the hysteresis loop from remanent state "0" toward saturation in the "*b*" direction of Fig. 2.

Now let it be assumed, that in the selection of switch core 18, for any reason whatsoever, the drive current of drive line 38b, obtained from drive source 28b, rises in magnitude to approximately two units of drive current. It is to be appreciated that this undesirable condition will produce spurious sizeable outputs or "noise" from the magnetic switch. Further this undesirable condition will materially shorten the life of the drive source 28b. However, as more fully explained below, the change in magnetic flux flowing in balance core 52 will tend to oppose the rise in drive current in drive line 38b. Further winding 62 on balance core 52 will render an output indicating that the drive current of drive line 38b is detrimentally high in magnitude.

Referring to Fig. 1 it will be seen that: with two units of drive current flowing in drive line 38b; with one unit of drive current flowing in drive line 40b: with one unit of drive current flowing in drive line 42b; and with one unit of drive current flowing in drive line 44b, the conditions enumerated below will exist.

(*a*) Balance core 52 has impressed thereon a resultant magnetomotive force of three units in the "1" sense; that is eight units of magnetomotive force in the "1" sense, due to two units of drive current in drive line 38b, are counteracted in part by the five units of magnetomotive force in the "0" sense due to the five units of drive current in the common drive line 100c.

(*b*) Balance cores 54, 56 and 58 have respectively impressed thereon a resultant magnetomotive force of one unit in the "0" sense; that is the five units of magnetomotive force in the "0" sense impressed on each of the balance cores 54, 56, and 58, due to the five units of drive current in common drive line 100c are respectively counteracted in part by the four units of magnetomotive force in the "1" sense impressed respectively on said balance cores due to the unit of drive current in each of the drive lines 40b, 42b and 44b.

(*c*) Balance cores 51, 53, 55 and 57 have respectively impressed thereon a magnetomotive force of five units in the "0" sense due to the five units of drive current in common drive line 100c.

From the afore-recited conditions and an inspection of Fig. 2, it will be seen that: a flux change of $\Delta B_2$ in the "1" sense is experienced by core 52: a flux change of less than $\Delta B_1$ in the "0" sense will be experienced by each of the balance cores 54, 56 and 58: and a flux change of approximately $\Delta B_1$ will be experienced by each of the cores 51, 53, 55 and 57. The flux change $\Delta B_2$ is in the "1" sense, and is very much larger in magnitude than the flux change $\Delta B_1$ which is in the "0" sense. Thus it will be appreciated that the voltage induced in winding 62 of balance core 52 is very much larger in magnitude than the voltage induced in windings 61, 63, 64, 65, 66, 67 and 68, respectively, of balance cores 51, 53, 54, 55, 56, 57 and 58. Of further significance is the fact that the signal induced in winding 62 is of a first polarity, opposite to that of the smaller signals induced respectively in windings 61 and 63 through 68. Further, it will be appreciated that the magnetic flux increase $\Delta B_2$ of balance core 52 opposes the rise in drive current in drive line 38b. This is an application of the well known law of physics, namely, Lenz's law. Thus, it is apparent that each balance core performs two functions, namely, it tends by Lenz's law to suppress a rise in magnitude of the driver current above its normal level in the drive line associated therewith, and, when the drive current is of the order of 10%, or more, above the the desired level in magnitude, an appreciable output of a predetermined polarity will appear in the associated balance core winding.

Now reference is made to the earlier specific example of operation, wherein the drive current in drive line 38b was assumed for purposes of explanation to be of the order of two units and the drive current flowing in drive lines 40b, 42b and 44b was respectively of the order of one unit. It is recalled that each of the balance core windings, 61 through 68, had an output voltage induced therein. However, it is apparent from an inspection of Figs. 1 and 2, and the foregoing detailed explanation thereof, that the magnitude of the voltage induced in winding 62 of balance core 52 is far greater than that induced in any of the windings 61 and 63 through 68. More significantly, however, the voltage induced in winding 62 is of a predetermined polarity. Hence, for example, by properly poled diodes connected to output windings 61 through 68, respectively, only the induced voltage having a predetermined polarity will be permitted to pass into an OR circuit or other utilization apparatus. This would readily permit prompt detection of spurious operation of the magnetic switch, and of a drive source that was rendering an undesirably high drive current. Prompt detection of a drive current that is undesirably high in magnitude precludes the repeated introduction of spurious outputs from a magnetic switch and the shortening of the life of the drive source.

From the foregoing detailed explanation of an illustrative embodiment of applicant's invention, it will be readily apparent to those skilled in the art that the outputs from balance core windings 61 through 68 may be employed with suitable means, known to the prior art, to render a visual manifestation indicative of the drive source rendering an undesirably high magnitude drive current.

From the full and complete description of applicant's invention and the illustrative examples of the operation thereof, together with an inspection of Figs. 1 and 2, and Table III, it is fully apparent that an undesirably high drive current in any of the drive lines, namely 38a, 38b, 40a, 40b, 42a, 42b, 44a and 44b, will result in a signal of appreciable magnitude and of a predetermined polarity being manifested in the output balance core winding (61 through 68) corresponding to the drive line having an unduly high drive current flowing therein.

Still further, from the full and complete teaching of applicant's invention it will be apparent to those skilled in the art that by the employment of two balance cores per drive line, properly interconnected, i.e., electromagnetically coupled in the proper sense to the respective drive lines and the common drive line, a positive manifestation may be obtained that a drive line is subjected to an undesirably low drive current or an undesirably high drive current.

As will be apparent to those skilled in the art the hysteresis characteristic of the balance cores may be different from those of the switch cores. In the illustrative example set forth herein the hysteresis character of the balance cores and switch cores were assumed to be identical, and as shown in Fig. 2.

Still further, it will be appreciated that applicant's protection apparatus could be employed with a variety of equipment and is in no sense to be construed as limited to employment with a magnetic switch device. While the illustrative embodiment of applicant's invention is a magnetic switch device utilizing unipolar drivers it will be appreciated from the teaching of applicant's invention that it can be employed with a magnetic switch device utilizing bipolar drivers.

While the invention has been particularly shown and described with reference to preferred embodiments thereof, it will be understood by those skilled in the art that various changes in form and details may be made therein without departing from the spirit and scope of the invention.

What is claimed is:

1. A magnetic switch for use with a magnetic core memory, said magnetic switch including: a first magnetic switch core, a second magnetic switch core, a third magnetic switch core, a fourth magnetic switch core, a fifth magnetic switch core, a sixth magnetic switch core, a seventh magnetic switch core, and an eighth magnetic switch core; a first magnetic balance core, a second magnetic balance core, a third magnetic balance core, a fourth magnetic balance core, a fifth magnetic balance core, a sixth magnetic balance core, a seventh magnetic balance core, and an eighth magnetic balance core; a first energizable current source means having an output winding electromagnetically coupled to said first, second, third and fourth magnetic switch cores in a first sense, to said fifth, sixth, seventh and eighth magnetic switch cores in a second sense, and to said first magnetic balance core in said first and second senses; a second energizable current source means having an output winding electromagnetically coupled to said first, second, third and fourth magnetic switch cores in said second sense, to said fifth, sixth, seventh and eighth magnetic switch cores in said first sense, and to said second magnetic balance core in said first and second senses; a third energizable current source means having an output winding electromagnetically coupled to said first, third, sixth and eighth magnetic switch cores in said first sense, to said second, fourth, fifth and seventh magnetic switch cores in said second sense, and to said third magnetic balance core in said first and second senses: a fourth energizable current source means having an output winding electromagnetically coupled to said first, third, sixth and eighth magnetic switch cores in said second sense, to said second, fourth, fifth and seventh magnetic switch cores in said first sense, and to said fourth magnetic balance core in said first and second senses; a fifth energizable current source means having an output winding electromagnetically coupled to said first, second, seventh and eighth magnetic switch cores in said first sense, to said third, fourth, fifth and sixth magnetic switch cores in said second sense, and to said fifth magnetic balance core in said first and second senses; a sixth energizable current source means having an output winding electromagnetically coupled to said first, second, seventh and eighth magnetic switch cores in said second sense, to said third, fourth, fifth and sixth magnetic switch cores in said first sense, and to said sixth magnetic balance core in said first and second senses; a seventh energizable current source means having an output winding electromagnetically coupled to said first, fourth, sixth and seventh magnetic switch cores in said first sense, to said second, third, fifth and eighth magnetic switch cores in said second sense, and to said seventh magnetic balance core in said first and second senses; an eighth energizable current source means having an output winding electromagnetically coupled to said first, fourth, sixth and seventh magnetic switch cores in said second sense, to said second, third, fifth and eighth magnetic switch cores in said first sense, and to said eighth magnetic balance core in said first and second senses; eight output switch core windings each electromagnetically coupled to a discrete one of said eight magnetic switch cores; eight output balance core windings each electromagnetically coupled to a discrete one of said eight magnetic balance cores; and additional means for energizing certain ones of said eight current source means in accordance with a predetermined code, whereby an output will be obtained from only a predetermined one of said eight magnetic switch core output windings and an output will be obtained only from each magnetic balance core output winding whose corresponding current source has supplied an unduly high magnitude output current.

2. Magnetic switch for use with a magnetic core memory, said magnetic switch including: a first magnetic switch core, a second magnetic switch core, a third magnetic switch core, a fourth magnetic switch core, a fifth magnetic switch core, a sixth magnetic switch core, a seventh magnetic switch core, and an eighth magnetic switch core; a first magnetic balance core, a second magnetic balance core, a third magnetic balance core, a fourth magnetic balance core, a fifth magnetic balance core, a sixth magnetic balance core, a seventh magnetic balance core, and an eighth magnetic balance core; a first energizable current source means having an output, electromagnetically coupled in a first sense to said first, second, third and fourth magnetic switch cores, electromagnetically coupled in a second sense to said fifth, sixth, seventh and eighth magnetic switch cores, and electromagnetically coupled in said first sense to said first magnetic balance core; a second energizable current source means having an output, electromagnetically coupled in said second sense to said first, second, third and fourth magnetic switch cores, electromagnetically coupled in said first sense to said fifth, sixth, seventh and eighth magnetic switch cores, and electromagnetically coupled in said first sense to said second magnetic balance core; a third energizable current source means having an output, electromagnetically coupled in said first sense to said first, third, sixth and eighth magnetic switch cores, electromagnetically coupled in said second sense to said second, fourth, fifth and seventh magnetic switch cores and electromagnetically coupled in said first sense to said third magnetic balance core; a fourth energizable current source means having an output, electromagnetically coupled in said second sense to said first, third, sixth and eighth magnetic switch cores, electromagnetically coupled in said first sense to said second, fourth, fifth and seventh magnetic switch cores, and electromagnetically coupled in said first sense to said fourth magnetic balance core; a fifth energizable current source means having an output, electromagnetically coupled in said first sense to said first, second, seventh and eighth magnetic switch cores, electromagnetically coupled in said second sense to said third, fourth, fifth and sixth magnetic switch cores, and electromagnetically coupled in said first sense to said fifth magnetic balance core; a sixth energizable current source means having an output, electromagnetically coupled in said second sense to said first, second, seventh and eighth magnetic switch cores, electromagnetically coupled in said first sense to said third, fourth, fifth and sixth magnetic switch cores, and electromagnetically coupled in said first sense to said sixth magnetic balance core; a seventh energizable current source means having an output, electromagnetically coupled in said first sense to said first, fourth, sixth and seventh magnetic switch cores, electromagnetically coupled in said second sense to said second, third, fifth and eighth magnetic switch cores, and electromagnetically coupled in said first sense to said seventh magnetic balance core; an eighth energizable current source means having an output, electromagnetically coupled in said second sense to said first, fourth, sixth and seventh magnetic switch cores, electromagnetically coupled in said first sense to said second, third, fifth and eighth magnetic switch cores, and electromagnetically coupled in said first sense to said eighth magnetic balance core; eight output switch core windings each electromagnetically coupled to a discrete one of said eight magnetic switch cores; eight output balance core windings each electromagnetically coupled to a discrete one of said eight magnetic balance cores; eight diodes each serially connected to a discrete one of said eight output balance core windings; means electromagnetically coupled in a second sense to each of said eight magnetic balance cores and connected to the output of each of said eight current source means; and additional means for energizing certain ones of said eight current source means in accordance with a predetermined code, whereby an output will be obtained from only a predetermined one of said eight magnetic switch core output windings and an output will be obtained only from each magnetic balance core output winding whose corresponding current source has supplied an unduly high magnitude output current.

3. A magnetic switch for use with a magnetic core memory, said magnetic switch including: a first magnetic switch core, a second magnetic switch core, a third magnetic switch core, a fourth magnetic switch core, a fifth magnetic switch core, a sixth magnetic switch core, and a seventh magnetic switch core, and an eighth magnetic switch core; a first magnetic balance core, a second magnetic balance core, a third magnetic balance core, a fourth magnetic balance core, a fifth magnetic balance core, a sixth magnetic balance core, a seventh magnetic balance core, and an eighth magnetic balance core; a first energizable current source means having an output, electromagnetically coupled in a first sense to said first, second, third and fourth magnetic switch cores, electromagnetically coupled in a second sense to said fifth, sixth, seventh and eighth magnetic switch cores, and electromagnetically coupled in said first sense to said first magnetic balance core; a second energizable current source means having an output, electromagnetically coupled in said second sense to said first, second, third and fourth magnetic switch cores, electromagnetically coupled in said first sense to said fifth, sixth, seventh and eighth magnetic switch cores, and electromagnetically coupled in said first sense to said second magnetic balance core; a third energizable current source means having an output, electromagnetically coupled in said first sense to said first, third, sixth and eighth magnetic switch cores, electromagnetically coupled in said second sense to said second, fourth, fifth and seventh magnetic switch cores, and electromagnetically coupled in said first sense to said third magnetic balance core; a fourth energizable current source means having an output, electromagnetically coupled in said second sense to said first, third, sixth and eighth magnetic switch cores, electromagnetically coupled in said first sense to said second, fourth, fifth and seventh magnetic switch cores, and electromagnetically coupled in said first sense to said fourth magnetic balance core; a fifth energizable current source means having an output, electromagnetically coupled in said first sense to said first, second, seventh and eighth magnetic switch cores, electromagnetically coupled in said second sense to said third, fourth, fifth and sixth magnetic switch cores, and electromagnetically coupled in said first sense to said fifth magnetic balance core; a sixth energizable current source means having an output, electromagnetically coupled in said second sense to said first, second, seventh and eighth magnetic switch cores, electromagnetically coupled in said first sense to said third, fourth, fifth and sixth magnetic switch cores, and electromagnetically coupled in said first sense to said sixth magnetic balance core; a seventh energizable current source means having an output, electromagnetically coupled in said first sense to said first, fourth, sixth and seventh magnetic switch cores, electromagnetically coupled in said second sense to said second, third, fifth and eighth magnetic switch cores, and electromagnetically coupled in said first sense to said seventh magnetic balance core; an eighth energizable current source means having an output, electromagnetically coupled in said second sense to said first, fourth, sixth and seventh magnetic switch cores, electromagnetically coupled in said first sense to said second, third, fifth and eighth magnetic switch cores, and electromagnetically coupled in said first sense to said eighth magnetic balance core; eight output switch core windings each electromagnetically coupled to a discrete one of said eight magnetic switch cores; eight output balance core windings each electromagnetically coupled to a discrete one of said eight magnetic balance cores; means electromagnetically coupled in a second sense to each of said eight magnetic balance cores and connected to the output of each of said eight current source means; and additional means for energizing certain ones of said eight current source means in accordance with a predetermined code, whereby an output will be obtained from only a predetermined one of said eight magnetic switch core output windings and an output will be obtained only from each magnetic balance core output winding whose corresponding current source has supplied an unduly high magnitude output current.

4. Magnetic switch for use with a magnetic core memory, said magnetic switch including: a first magnetic switch core, a second magnetic switch core, a third magnetic switch core, a fourth magnetic switch core, a fifth magnetic switch core, a sixth magnetic switch core, a seventh magnetic switch core, and an eighth magnetic switch core; a first magnetic balance core, a second magnetic balance core, a third magnetic balance core, a fourth magnetic balance core, a fifth magnetic balance core, a sixth magnetic balance core, a seventh magnetic balance core, and an eighth magnetic balance core; a first energizable current source means having an output, electromagnetically coupled in a first sense to said first, second, third and fourth magnetic switch cores, electromagnetically coupled in a second sense to said fifth, sixth, seventh and eighth magnetic switch cores, and electromagnetically coupled in said second sense to said first magnetic balance core; a second energizable current source means having an output, electromagnetically coupled in said second sense to said first, second, third and fourth magnetic switch cores, electromagnetically coupled in said first sense to said fifth, sixth, seventh and eighth magnetic switch cores, and electromagnetically coupled in said second sense to said second magnetic balance core; a third energizable current source means having an output, electromagnetically coupled in said first sense to said first, third, sixth and eighth magnetic switch cores, electromagnetically coupled in said second sense to said second, fourth, fifth and seventh magnetic switch cores and electromagnetically coupled in said second sense to said third magnetic balance core; a fourth energizable current source means having an output, electromagnetically coupled in said second sense to said first, third, sixth and eighth magnetic switch cores, electromagnetically coupled in said first sense to said second, fourth, fifth and seventh magnetic switch cores, and electromagnetically coupled in said second sense to said fourth magnetic balance core; a fifth energizable current source means having an output, electromagnetically coupled in said first sense to said first, second, seventh and eighth magnetic switch cores, electromagnetically coupled in said second sense to said third, fourth, fifth and sixth magnetic switch cores, and electromagnetically coupled in said second sense to said fifth magnetic balance core; a sixth energizable current source means having an output, electromagnetically coupled in said second sense to said first, second, seventh and eighth magnetic switch cores, electromagnetically coupled in said first sense to said third, fourth, fifth and sixth magnetic switch cores, and electromagnetically coupled in said second sense to said sixth magnetic balance core; a seventh energizable current source means having an output, electromagnetically coupled in said first sense to said first, fourth, sixth and seventh magnetic switch cores, electromagnetically coupled in said second sense to said second, third, fifth and eighth magnetic switch cores, and electromagnetically coupled in said second sense to said seventh magnetic balance core; an eighth energizable current source means having an output, electromagnetically coupled in said second sense to said first, fourth, sixth and seventh magnetic switch cores, electromagnetically coupled in said first sense to said second, third, fifth and eighth magnetic switch cores, and electromagnetically coupled in said second sense to said eighth magnetic balance core; eight output switch core windings each electromagnetically coupled to a discrete one of said eight magnetic switch cores; eight output balance core windings each electromagnetically coupled to a discrete one of said eight magnetic balance cores; means electromagnetically coupled in a second sense to each of said eight magnetic balance cores and connected to the output of each of said eight current source means; and additional means for energizing certain ones of said eight current source means in accordance with a predetermined code, whereby an output will be obtained from only a predetermined one of said eight magnetic switch core output windings and an output will be obtained only from each magnetic balance core output winding whose corresponding current source has supplied an unduly low magnitude output current.

References Cited in the file of this patent

UNITED STATES PATENTS

| | | |
|---|---|---|
| 2,691,156 | Saltz | Oct. 5, 1954 |
| 2,691,157 | Stuart-Williams | Oct. 5, 1954 |
| 2,768,367 | Rajchman | Oct. 23, 1956 |